United States Patent
Cimino

(10) Patent No.: US 8,381,307 B2
(45) Date of Patent: Feb. 19, 2013

(54) METHOD FOR PROTECTING A CONVERTED APPLET (CAP) FILE INCLUDING ENCRYPTING THE CAP FILE

(75) Inventor: Carlo Cimino, Itri (IT)

(73) Assignee: Incard S.A., Geneva (CH)

( * ) Notice: Subject to any disclaimer, the term of this patent is extended or adjusted under 35 U.S.C. 154(b) by 446 days.

(21) Appl. No.: 12/412,983

(22) Filed: Mar. 27, 2009

(65) Prior Publication Data
US 2009/0290704 A1    Nov. 26, 2009

(30) Foreign Application Priority Data
Mar. 28, 2008 (IT) ............... MI2008A0536

(51) Int. Cl.
*G06F 21/51* (2006.01)
(52) U.S. Cl. ............... 726/27; 726/9; 713/191; 380/277
(58) Field of Classification Search ............. 380/28–30, 380/45, 277; 726/27, 9; 713/191
See application file for complete search history.

(56) References Cited

U.S. PATENT DOCUMENTS

| | | | |
|---|---|---|---|
| 6,005,942 A * | 12/1999 | Chan et al. | 713/187 |
| 6,385,723 B1 * | 5/2002 | Richards | 713/160 |
| 6,931,379 B1 * | 8/2005 | Sato et al. | 705/50 |
| 6,981,245 B1 * | 12/2005 | Schwabe | 717/126 |
| 7,484,095 B2 * | 1/2009 | de Jong | 713/170 |
| 7,523,495 B2 * | 4/2009 | Johnson | 726/20 |
| 2003/0046238 A1 * | 3/2003 | Nonaka et al. | 705/51 |
| 2003/0101350 A1 * | 5/2003 | Takada et al. | 713/189 |
| 2003/0111528 A1 * | 6/2003 | Sato et al. | 235/380 |
| 2006/0086785 A1 * | 4/2006 | Sakata | 235/380 |
| 2008/0010470 A1 * | 1/2008 | McKeon et al. | 713/194 |
| 2008/0126705 A1 * | 5/2008 | Jogand-Coulomb et al. | 711/115 |

FOREIGN PATENT DOCUMENTS

| | | |
|---|---|---|
| EP | 1321907 | 6/2003 |
| WO | 98/52158 | 11/1998 |

OTHER PUBLICATIONS

Chen, "Technology for smart cards: 1-10 architecture and programmer's guide", Internet Citation, Retrieved from Internet: http://java.sun.com/developer/books/consumerproducts/javacad/ch03.pdf>, retrieved on Nov. 15, 2004, pp. 1-20.

* cited by examiner

*Primary Examiner* — Kaveh Abrishamkar
*Assistant Examiner* — Theodore Parsons
(74) *Attorney, Agent, or Firm* — Allen, Dyer, Doppelt, Milbrath & Gilchrist, P.A.

(57) ABSTRACT

A method for protecting a CAP file including one or more applets to be installed in an IC Card, includes the applets encoding into the CAP file by a CAP file provider. The method also includes the CAP file downloading into the IC Card by a CAP file issuer, and storing an installation program inside the IC Card. The installation program extracts the applets from the CAP file and installs them in the IC Card, after the downloading. The CAP file provider encrypts the CAP file into a protected CAP file to avoid the applets being extracted before the downloading. The IC Card includes a decryption circuit for decrypting the protected CAP file downloaded into the IC Card. The installation of the applet is enabled by the decryption circuit.

16 Claims, 2 Drawing Sheets

METHOD FOR PROTECTING A CONVERTED APPLET (CAP) FILE INCLUDING ENCRYPTING THE CAP FILE

FIELD OF THE INVENTION

The present invention relates to a method for protecting a converted applet (CAP) file including one or more applets to be installed in an IC Card.

More particularly, the present invention relates to a method of the type described above wherein the CAP file is downloaded into the IC Card according to a predetermined protocol intended to check the CAP file.

BACKGROUND OF THE INVENTION

As may be known, a CAP file is a file including one or more applets intended to be downloaded into an IC Card. Hereinafter, a brief explanation of the steps involved in the generation of the CAP file and its downloading into the IC Card are given.

A software programmer generates a CAP file by coding one or more java applets, including at least a java class, compiling the java class into a .class file, and converting the .class file into a CAP file, intended to be downloaded into the IC Card.

The steps of coding and compiling the java applet, as well as the step of converting it into a CAP file, are executed in a conventional way, for example, through a java programming environment installed in a programming device. The device may include an editor for coding the java applets, a compiler for compiling the .class files, and a converter for converting the CAP file.

With reference to FIG. 1, the downloading of the CAP file 3 from a card terminal 2 to an IC Card 1 is schematically represented. The IC Card 1 includes a platform for executing applets, not shown because it is conventional. More particularly, the platform includes a hardware platform based on the circuitry and electric components, and a software platform, including service programs that support the execution of applets.

The software platform may include a java platform. The java platform may include an installation program 4 for extracting the applets from the CAP file 3 and for storing them in a memory portion 5 of the IC Card 1, and a java virtual machine 6 for execution of the applets.

More particularly, the installation program 4 receives the CAP file 3 from the card terminal 2 and prepares the applets to be executed by the java virtual machine 6. The java virtual machine 6, substantially, is generally not aware of the CAP file 3 because it executes the applets already prepared for execution by the installation program 4.

The downloading of the CAP file 3 from the terminal 2 to the IC Card 1 is executed by an authorized IC Card issuer that is responsible to release only IC Cards compliant with precise specifications. The CAP file is prepared by the software programmer, also known as a CAP file provider, and delivered by the CAP file provider to the CAP file issuer for downloading. The IC Card manufacturer may also be the CAP file provider so that the IC Card, together with a set of applets included in the corresponding CAP file, is provided by the IC Card manufacturer to the IC Card issuer.

More particularly, according to international standard specifications, for example, the 03.48 specification for the mobile word or the GlobalPlatform specification, downloading the CAP file into the IC Card must typically respect some requirements, including:

1—allowing only the authorized CAP file issuer to download the CAP file 3 into the IC Card 1;
2—recognizing that data corruption occurred during I/O communication between the terminal 2 and the IC Card 1; and
3—avoiding disclosure of the CAP file 3 during I/O communication.

Such requirements are generally respected by introducing the following security in the communication between the terminal 2 and the IC Card 1:

1—performing a mutual authentication between the IC Card 1 and the IC Card issuer;
2—adding an integrity control check to the CAP file 3 received by the IC Card 1; and
3—encrypting the CAP file 3 before transmission.

FIG. 2 schematically represents the steps involved in the downloading of the CAP file 3 when the security described above is provided. More particularly, a secure protocol 7 is used by the IC Card issuer for encrypting the CAP file 3 in an encrypted CAP file 3a, before the downloading of the CAP file 3 from the card terminal 2 to the IC Card 1.

The same secure protocol 7 is used inside the IC Card 1 for decrypting the CAP file 3a into the CAP file 3. The decrypted CAP file 3 is then processed by the installation program 4, as already described with reference to FIG. 1. More particularly, the security is implemented through a transport protocol based on cryptographic keys stored in the IC Card 1 by the IC Card manufacturer and communicated by the IC Card manufacturer to the IC Card issuer.

Even if the above described security adds a certain protection to the CAP file 3, some drawbacks still limit such protection, because, when the CAP file 3 is delivered by the IC Card provider to the IC Card issuer, it is subject to intercepting and copying. More particularly, an intercepted CAP file could be reverse engineered so that the corresponding code of the applets is discovered, thus resulting in damage for the IC Card provider.

In fact, especially when the IC Card manufacturer is the IC Card provider, many efforts are involved to provide the IC Card 1, together with a complete set of applets included in the CAP file 3. Moreover, even if the CAP file is not reverse engineered, and the code of the applets is not discovered, another problem remains because the CAP file 3 may be directly downloaded and installed into an IC Card different to the IC Card 1 provided by the IC Card manufacturer. In fact, due to the portability of the java applets, the applets included in the CAP file 3 can be installed substantially into any IC Card provided with a java platform, resulting also in this case in a great damage for the IC Card manufacturer.

The problem is that of providing a method for protecting the CAP file for an IC Card so that the applet included in the CAP file can be executed only into a specific IC Card provided by a specific IC Card manufacturer, avoiding a downloading and installation of the CAP file into a third party IC Card, the method also being able to prevent a reverse engineering of the CAP file intended to discover the code at the base of the applets.

SUMMARY OF THE INVENTION

The present embodiments provide encryption of a CAP file before its delivery to the IC Card issuer, and provide the IC Card platform with a decryption circuit for decrypting the encrypted CAP file and enabling installation of the applets included therein.

One aspect is directed to a method for protecting a CAP file including one or more applets to be installed in an IC Card.

The applets are encoded into the CAP file by a CAP file provider, the CAP file is downloaded into the IC Card by a CAP file issuer, and an installation program, stored inside the IC Card, extracts the applets from the CAP file and installs them in the IC Card after the downloading. The CAP file provider encrypts the CAP file into a protected CAP file, to avoid the applets being extracted before the downloading. The IC Card decrypts the protected CAP file after the downloading. The installation of the applet is enabled by the decrypting.

Advantageously, after the encryption executed by the CAP file provider, the CAP file generally cannot be reverse engineered. At the same time, the IC Card issuer is able to perform the downloading step for checking that the applets are compliant with specifications, since the IC Card platform decrypts the Cap file. Advantageously, the portability of the CAP file is limited to the IC Card provided with a decryption circuit.

Further characteristics and the advantages of the method will be apparent from the following description of an embodiment thereof, made with reference to the annexed drawings, given for indicative and non-limiting purpose.

DETAILED DESCRIPTION OF THE PREFERRED EMBODIMENTS

Figure 1:
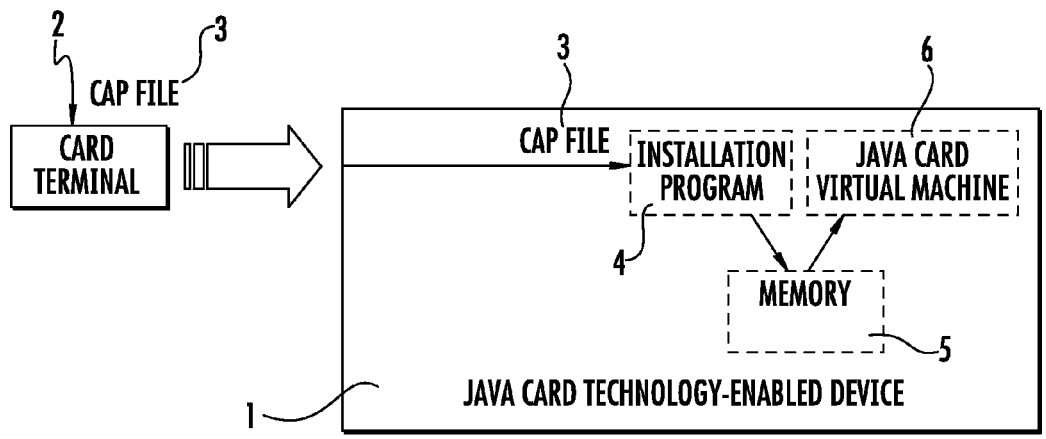
FIG. 1 schematically shows a downloading of a CAP file from a terminal to an IC Card and an installation of the corresponding applets inside the IC Card, according to the prior art.
Figure 2:
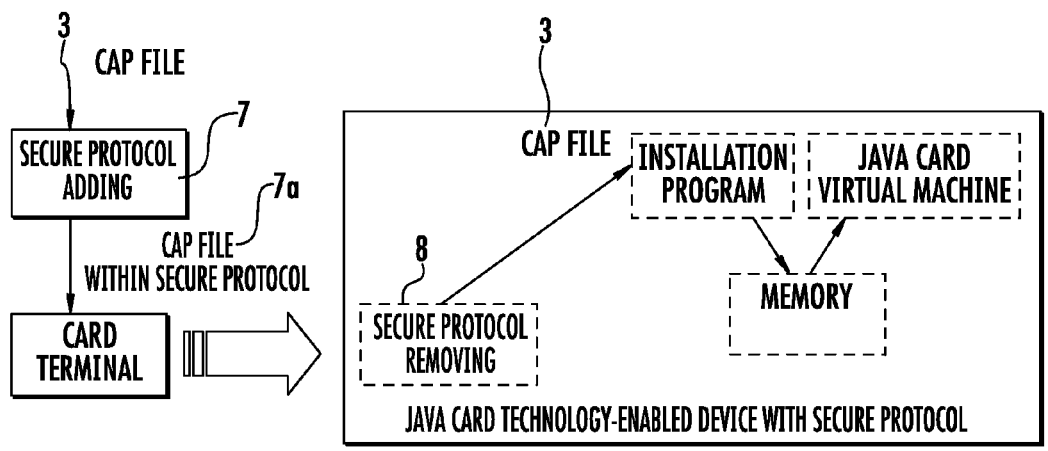
FIG. 2 schematically shows the downloading of the CAP file of FIG. 1, including a security protocol, according to the prior art.
Figure 3:
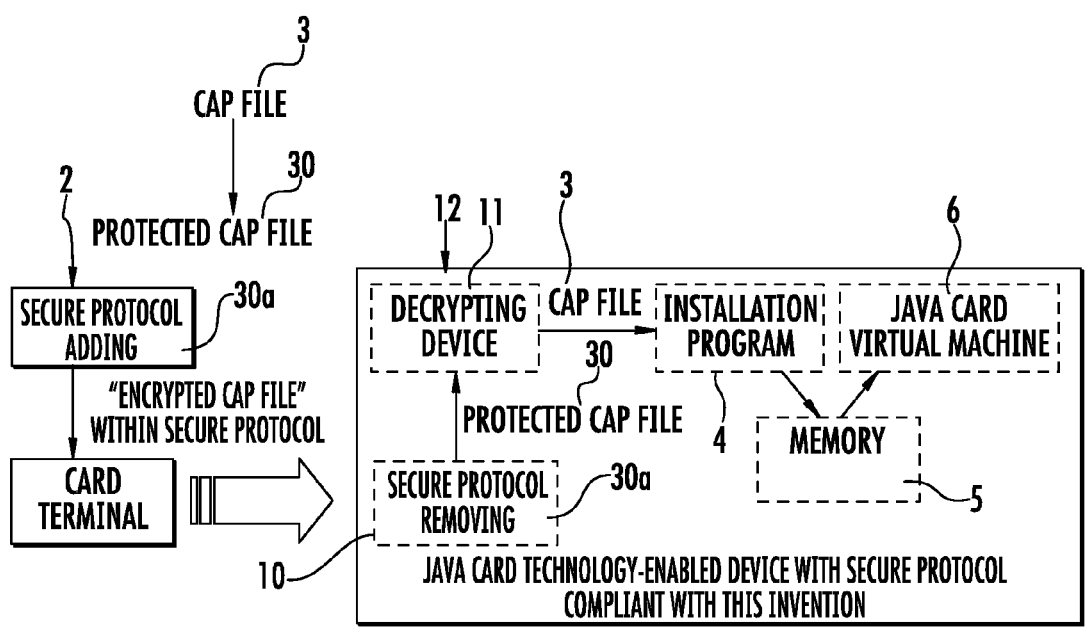
FIG. 3 schematically shows the downloading of the CAP file from the terminal to the IC Card, according to the present invention.

With reference to FIG. 3, a method for protecting a CAP file 3 for an IC Card 10 is schematically represented. The IC Card 10 includes a java platform, (not represented because conventional). The java platform includes an installation program 4, intended to extract one or more applets included inside the CAP file 3 and to store them into a memory portion 5 of the IC Card 10. The java platform also includes a java virtual machine 6 for the execution of the applets.

More particularly, when the installation program 4 receives the CAP file 3, it prepares the applets to be executed by the java virtual machine 6. The java virtual machine 6, substantially, is generally not aware of the CAP file 3 because it executes the applets already prepared for execution by the installation program 4.

The CAP file 3 is prepared by a CAP file provider, coding one or more applets, compiling and converting them into the CAP file 3. The CAP file provider may also be the producer of the IC Card 10, hereafter indicated as an IC Card manufacturer.

The CAP file provider encrypts the CAP file 3 into a protected CAP file 30 and delivers the protected CAP file 30 to the CAP file issuer. The CAP file provider also provides the IC Card 10 with a decryption algorithm for use in a decryption circuit 11 to decrypt the protected CAP file 30.

The protected CAP file 30 and the decryption circuit 11 for decrypting it, avoid the applets and the corresponding code being retrieved from the CAP file 3. This is because the decryption of the protected CAP file 30 is typically allowed only to the CAP file provider, since he is aware of the decryption algorithm implemented in the decryption circuit 11, and to the IC Card 10, since it includes the decryption algorithm for decrypting the protected CAP file 30.

Moreover, the execution of the applets are allowed only inside the IC Card 10 provided with the decryption algorithm, and the portability of the applets included inside the protected CAP file 30 is advantageously limited. In other words, even if the protected CAP file 30 could be downloaded inside an IC Card not provided with the decryption circuit 11 implementing the decryption algorithm, its execution would be denied since the protected CAP file 30 could not be decrypted.

The protected CAP file 30 is delivered from the CAP file provider to the CAP file issuer responsible for downloading it into the IC Card 10 according to a communication protocol between the terminal 2 of the CAP file issuer and the IC Card 10. More particularly, the IC Card issuer provides for using a secure protocol 7 for encrypting the protected CAP file 30 into an encrypted CAP file 30a, before downloading of the protected CAP file 30 from the card terminal 2 to the IC Card 10. The security protocol uses cryptographic keys, stored in the IC Card 10 by the IC Card manufacturer and communicated by the IC Card manufacturer to the IC Card issuer.

The same secure protocol 7 is used inside the IC Card 10 for decrypting the encrypted CAP file 30a into the protected CAP file 30. The CAP file 3 is then obtained from a decryption of the protected CAP file 3, by the decryption circuit 11 included inside the IC Card 10. The CAP file 3 is sent by the decryption circuit 11 to the installation program 4, as represented in FIG. 3.

The installation program 4 receives the CAP file 3 and prepares the included applets to be executed by the java virtual machine 6. Advantageously, the java virtual machine 6 remains aware of the CAP file 3, because it executes the applets already prepared for execution by the installation program 4, and the downloading steps executed by the IC Card issuer remains substantially unchanged.

More particularly, hereafter an embodiment of the method is described. A CAP file 3 provided by a CAP file provider is protected with encryption through a secret key Kcard, thereby obtaining a protected CAP file 30. A platform of an IC Card 10 for receiving the protected CAP file 30 is equipped with the secret key Kcard used to encrypt the CAP file 3. The IC Card 10 includes a deciphering device 12 for decrypting the protected CAP file 30 with the secret key Kcard. The deciphering device 12 is, for example, an additional portion of hardware of the IC Card 10 including the decryption circuit 11.

The protected CAP file 30 is delivered from the CAP file provider to the CAP file issuer and downloaded from a terminal 2 of the CAP file issuer into the java card platform of the IC Card 10. The CAP file issuer typically cannot discover the source code of the CAP file 3 since it receives the protected CAP file 30 and not the CAP file 3.

The principal features are hereafter resumed. A method for protecting a CAP file 3, including one or more applets to be installed in an IC Card 10 includes encoding the applets into the CAP file 3 via a CAP file provider. The CAP file provider is a device or a procedure installed in a device of the manufacturer of the IC Card or in a device of a software programmer responsible for encoding. The method also includes computing the applets and converting them into the corresponding CAP file 3. The method further includes downloading the CAP file 3 into the IC Card 10 via a CAP file issuer. The CAP file issuer is a device or a procedure installed in a device used by the issuer of IC Cards that is responsible to check CAP files.

The applets are extracted from the CAP file 3 and installed in the IC Card 10 after their downloading inside the IC Card 10. The CAP file provider encrypts the CAP file 3 into a protected CAP file 30 to avoid the applets being extracted before the downloading. The IC Card 10 includes a decryption circuit 11 for decrypting the protected CAP file 30. The installation of the applet is enabled by the decryption circuit 11.

The CAP file 30 is downloaded from the CAP file issuer to the IC Card 10 according to a predetermined protocol, including an encryption of the protected CAP file 30 into an encrypted CAP file 30a, before downloading, and a decryption of the encrypted CAP file 30a into the protected CAP file 30, after downloading. The encryption of the protected CAP file 30 is executed by the CAP file issuer, according to a first secret key, and the decryption of the encrypted CAP file 30a is executed inside the IC Card, the first secret key being stored inside the IC Card 10. The CAP file 3 is encrypted into the CAP file 30 by the CAP file provider using a second secret key. The second secret key is unknown to the CAP file issuer. The decryption circuit 11 decrypts the CAP file 30 into the CAP file 3 using the second secret key. The second secret key is stored by the CAP file provider in a predetermined memory portion of the IC Card 10.

The present embodiments also relate to an IC Card 10 implementing the method for protecting the CAP file. More particularly, the IC Card 10 includes an installation program 4 for extracting and installing one or more applets included in a CAP file 3. The CAP file 3 is being encoded by a CAP file provider and downloaded into the IC Card 10 by a CAP file issuer. The IC Card 10 includes a decryption circuit 11 for decrypting a protected CAP file 30 derived from an encryption of the CAP file 3 via the CAP file provider to avoid the applets being extracted before the downloading.

The decryption circuit 11 includes a second secret key for decrypting the protected CAP file 30. The decryption circuit 11 also includes an algorithm installed in a memory portion of the IC Card for decrypting the protected CAP file 30 via the second secret key.

According to another embodiment, the decryption circuit 11 includes an additional device storing a second secret key for decrypting the protected CAP file 30. In this embodiment, the IC Card 10 includes an additional portion of hardware that allows or locks the installation of applets included in a CAP file. Advantageously, detecting an IC Card 10 implementing the method is simple. In fact, a non-encrypted CAP file 3 includes a predetermined hexadecimal sequence of bytes, generally corresponding to the hexadecimal bytes "DECAF-FED." By analyzing the communication between the card terminal 2 and the IC Card 10 during the downloading of the CAP file 3, it is possible to understand if the CAP file 3 is in plain text format. In this case, it is easy to establish that the method for protecting the CAP file is not implemented.

Similarly, it is possible to understand if the CAP file 3 is encrypted by the secure protocol 7. When the CAP file 3 is encrypted into the encrypted CAP file 30a, the APDU commands sent from the card terminal 2 to the IC Card 10 are changed to inform the IC Card of the encryption. For example, using the GlobalPlatform secure protocol, a CLASS byte in the data sent from the card terminal 2 to the IC Card 10 are changed from '80' to '84' as follows:

1) 80 xx xx xx xx xx xx xx xx DE CA FF ED
2) 84 xx xx xx xx xx xx xx xx YY YY YY YY
3) 80 xx xx xx xx xx xx xx xx YY YY YY YY

Also in this case it is generally easy to establish that the method for protecting the CAP file 3 is not implemented, but that a secure protocol 7 is implemented.

Advantageously, after the encryption executed by the CAP file provider, the protected CAP file 30 typically cannot be reverse engineered. At the same time, the IC Card issuer is able to perform the downloading step for checking that the applets are compliant with specifications, since the IC Card platform is provided with the decryption circuit 11 for decrypting the CAP file 30. Advantageously, the portability of the CAP file 30 is allowed generally only for the IC Card 10 including the decryption circuit 11 implementing the decryption algorithm. Advantageously, the method typically does not involve the java virtual machine included in the platform of the IC Card, nor the installation program 4 of such IC Card, since the decryption circuit 11 returns a decrypted CAP file 3 to the installation program 4. In other words, both the java virtual machine and the installation program 4 are unchanged.

A further advantage is that the protocol between the card terminal 2 and the IC Card 10 is not affected. More particularly, a secure protocol 7, for example, the 03.48 or GlobalPlatform protocol, can be used between the card terminal 2 and the IC Card without modifications.

Advantageously, the method improves the security of transmission of the CAP file 3. In fact, while the secure protocol cited above provides security to the I/O communication between the IC Card 10 and the card terminal 2, the present embodiments extend the security to the communication between the CAP file provider the IC Card 10.

That which is claimed:

1. A method for protecting a converted applet (CAP) file including at least one applet to be installed in an integrated circuit (IC) Card having an IC Card manufacturer associated therewith, the at least one applet being encoded into the CAP file by a CAP file provider that is different from the IC Card manufacturer and downloaded into the IC Card by a CAP file issuer, and an installation program being stored inside the IC Card for extracting the at least one applet from the CAP file and installing the at least one applet in the IC Card after downloading, the method comprising:

decrypting an encrypted CAP file into a protected CAP file after downloading, the CAP file being encrypted into the protected CAP file by the CAP file provider according to a second secret key being unknown to the CAP file issuer to avoid the at least one applet being extracted before the downloading, and the protected CAP file being further encrypted into the encrypted CAP file before downloading according to a first secret key provided by the IC card manufacturer; and decrypting, via a decryption circuit in the IC Card, the protected CAP file using a decryption algorithm provided by the CAP file provider to generate the CAP file for enabling the installation program to install the at least one applet.

2. The method according to claim 1 wherein decrypting of the encrypted CAP file is executed by the IC Card, the first secret key being stored inside the IC Card.

3. The method according to claim 1 wherein the decryption circuit decrypts the protected CAP file into the CAP file according to the second secret key.

4. The method according to claim 3 wherein the second secret key is stored by the CAP file provider in a memory portion of the IC Card.

5. A method for protecting a file including at least one applet to be installed in an integrated circuit (IC) Card having a first entity associated therewith, the at least one applet being encoded into the file by a second entity that is different from the first entity and downloaded into the IC Card by a third entity, and an installation program being stored inside the IC Card for extracting the at least one applet from the file and installing the at least one applet in the IC Card after downloading, the method comprising:

decrypting an encrypted file into a protected file after downloading, the file being encrypted into the protected file by the second entity according to a second secret key being unknown to the third entity, and the protected file being further encrypted into the encrypted file by the third entity according to a first secret key provided by the first entity; and decrypting, via a decryption circuit in the IC Card, the protected file using a decryption provided by the second entity to generate the file for enabling the installation program to install the at least one applet.

6. The method according to claim 5 wherein decrypting of the encrypted file is executed by the IC Card, the first secret key being stored inside the IC Card.

7. The method according to claim 5 wherein the decryption circuit decrypts the protected file into the file according to the second secret key.

8. The method according to claim 7 wherein the second secret key is stored in a memory portion of the IC Card.

9. An integrated circuit (IC) Card having an IC Card manufacturer associated therewith comprising:

an installation program for extracting and installing at least one applet included in a converted applet (CAP) file, the CAP file being encoded by a CAP file provider that is different from the IC Card manufacturer and downloaded into the IC Card by a CAP file issuer; and a decryption circuit configured to decrypt a protected CAP file based upon the CAP file provider, the protected CAP file derived from an encryption of the CAP file by the CAP file provider to avoid the applets from being extracted before the downloading, the CAP file being encrypted into the protected CAP file by the CAP file provider according to a second secret key unknown to the CAP file issuer, the protected CAP file being encrypted into an encrypted CAP file before downloading by the CAP file issuer, the protected CAP file being encrypted according to a first secret key provided by the IC Card manufacturer, and the encrypted CAP file being decrypted into the protected CAP file after downloading.

10. The IC Card according to claim 9 wherein said decryption circuit is configured to decrypt the protected CAP file according to the second secret key.

11. The IC Card according to claim 10 further comprising a memory portion; and wherein said decryption circuit is configured to operate according to an algorithm installed in the memory portion of the IC Card for decrypting the protected CAP file using the second secret key.

12. The IC Card according to claim 9 wherein said decryption circuit comprises an additional device configured to store the second secret key.

13. An integrated circuit (IC) Card having a first entity associated therewith comprising:

an installation program for extracting and installing at least one applet included in a file, the file being encoded by a second entity that is different from the first entity and downloaded into the IC Card by a third entity; and a decryption circuit configured to decrypt a protected file based upon a second entity, the protected file derived from an encryption of the file by the second entity according to a second secret key unknown to the third entity, the protected file being encrypted into an encrypted file by the third entity, the protected file being encrypted according to a first secret key provided by the first entity, and the encrypted file being decrypted into the protected file after downloading.

14. The IC Card according to claim 13 wherein said decryption circuit is configured to decrypt the protected file according to the second secret key.

15. The IC Card according to claim 14 further comprising a memory portion; and wherein said decryption circuit is configured to operate according to an algorithm installed in the memory portion of the IC Card for decrypting the protected file using the second secret key.

16. The IC Card according to claim 13 wherein said decryption circuit comprises an additional device configured to store the second secret key.

\* \* \* \* \*